March 5, 1968   J. A. JOHNSON   3,371,899
SHOCK ABSORBING APPARATUS

Filed Aug. 13, 1965   5 Sheets-Sheet 1

INVENTOR.
JOHN ALGOT JOHNSON
BY
Brumbaugh, Free, Graves & Donohue his ATTORNEYS

March 5, 1968  J. A. JOHNSON  3,371,899

SHOCK ABSORBING APPARATUS

Filed Aug. 13, 1965  5 Sheets-Sheet 3

INVENTOR.
JOHN ALGOT JOHNSON

BY Brumbaugh, Free, Graves & Donohue his ATTORNEYS

INVENTOR.
JOHN ALGOT JOHNSON 3,371,899
SHOCK ABSORBING APPARATUS
John Algot Johnson, 9 Sheridan Drive,
Short Hills, N.J. 07078
Filed Aug. 13, 1965, Ser. No. 479,433
10 Claims. (Cl. 248—119)

ABSTRACT OF THE DISCLOSURE

A shock absorbing apparatus including a load-supporting platform slidably mounted on guides carried by vertically extending shock dampening elements for dissipating vertical and laterally directed high frequency shocks, the load-supporting platform being biased by means of pre-stressed springs to an equilibrium position on the guides, the springs being arranged to oppose low frequency shocks tending to displace the platform lengthwise of the guides and including braking means interposed between said platform and said guides which have a low static coefficient of friction which increases as the speed of displacement of the platform relative to the guides increases to thereby dissipate shock and ease restoration of the platform to the equilibrium position on the guides.

---

This invention relates to shock absorbing devices and, in particular, to a shock absorbing device suitable for removal of shock loads and low and high frequency vibrations which employs a unique frictional dampening brake, a unique horizontal spring and frictional dampening brake combination and a unique vertical vibration dampening design.

Movement of sensitive instruments and recording equipment without damage has been a problem with various modes of transportation. In particular the shock resulting from coupler forces in rail transportation has damaged recording equipment to such an extent that valid vibrational test data representative of this environment has been difficult, if not impossible, to obtain.

Efforts to date to isolate damaging shock and vibration have been concentrated on the use of low displacement rubber mounts. This type of isolation system will effectively reduce the transmission of high frequency vibration (above 13 c.p.s.) transmitted from a vehicle to the lading. However, due to its limited movement such a system will not reduce the transmission of low frequency vibration or impact loads from the vehicle.

Specifically, this invention discloses a means for decelerating or accelerating the movement of a platform more gradually than the acceleration or deceleration of the supporting surface. The primary braking system for removing low frequency vibrations acting along a single axis is a resilient system which may be composed of a series of compressed springs biased toward an equilibrium position. When the springs occupy this equilibrium position they are expanded to their maximum displacement during the operation cycle although the springs are compressed between a pair of stops attached to the supporting means even when in the equilibrium position. When a sudden force causes the supporting surface or reference frame to accelerate or decelerate, these stops will experience the same acceleration or deceleration and will move in the same direction. The movable platform, which also brackets the springs with impeller means, will, however, due to its inertia and the compressibility of the springs, respond more gradually to the change in velocity.

In addition, a braking surface composed of Teflon or a similar substance is fixed to the movable platform and is slidable over a rod or similar engaging surface attached to the supporting means. This frictional braking surface serves as a secondary braking system for modulating the response of the resilient system and is specifically designed so that it has a low coefficient of static friction and a coefficient of sliding friction which increases with an increase in the velocity of the braking surface as it slides over the supporting means. This secondary braking system, thus, not only contributes to the initial braking force altering the movement of the platform, but acts as a substantial dampening means for controlling the recoil of the compressed resilient system toward the equilibrium position.

Although a specific application of this invention is described herein, it should be remembered that other applications are within the scope of the invention such as a dual-modular or multi-modular unit where two or more units are used in different horizontal or vertical planes to absorb forces acting along more than one directional axis.

Other applications of this invention include a cushioning unit which will attenuate low frequency vertical shock and vibration, fire power recoil mechanisms, landing gear dampers for aircraft, cockpit control locks and rotor drag dampers in helicopters and other high speed rotary wing aircraft.

Other objects and a fuller understanding of this invention may be had by referring to the following description and claims taken in conjunction with the accompanying drawings in which:

With reference to the drawings, the invention is illustrated as being incorporated in the shock absorbing platform assembly indicated generally by the reference character 10. As illustrated this shock absorbing apparatus is attached to reference platform 12 by a plurality of vertical shock absorbers 14 which transfer generally all of the low-frequency horizontal motion of the reference platform 12 to two longitudinal supporting tracks 16 and 18. These two tracks 16 and 18, together with spaced walls 20 and 22, form a rectangular frame over which a platform 24 moves. The platform 24 is slidably supported on the longitudinal tracks 16 and 18 by guiding brackets 26 and 28 and the platform 24 is designed so that it also passes over a plurality of guiding rods 30 in the primary braking system and a braking rod 32 of the secondary braking system, all of which extend in a direction parallel to the longitudinal tracks 16 and 18 between the end walls 20 and 22.

Each guiding rod 30, as shown in detail in FIG. 2, has two spaced stops 34 and 36 attached to it at points below platform 24. Also, surrounding each guiding rod 30 is a spring sheath 25 which has an impeller means 52 at one end and an impeller means 54 at the other, each of which contains an aperture, 27 and 29 respectively, which is designed to pass over stops 34 and 36.

Between stops 34 and 36 within sheath 25, a plurality of floating guides 38, 40, 42 and 44 are positioned in series between a plurality of compression springs 46, 48 and 50. Spring 46, for example, is spaced between floating guides 38 and 40, while spring 48 is positioned between floating guides 40 and 42 and spring 50 is positioned between floating guides 42 and 44. All three compression springs, in the preferred embodiment, are in a compressed state even when they occupy the equilibrium position shown in FIG. 2 and are expanded to the maximum displacement allowed by the system. This results in a force being exerted on floats 38 and 44 in an outwardly direction which, in turn, press against stops 36 and 34. In addition, the impeller means 52 and 54 are designed so that they fall just outside of floating guides 38 and 44 when the latter are located in the equilibrium position shown in FIG. 2.

Figures 2, 2A, 3:
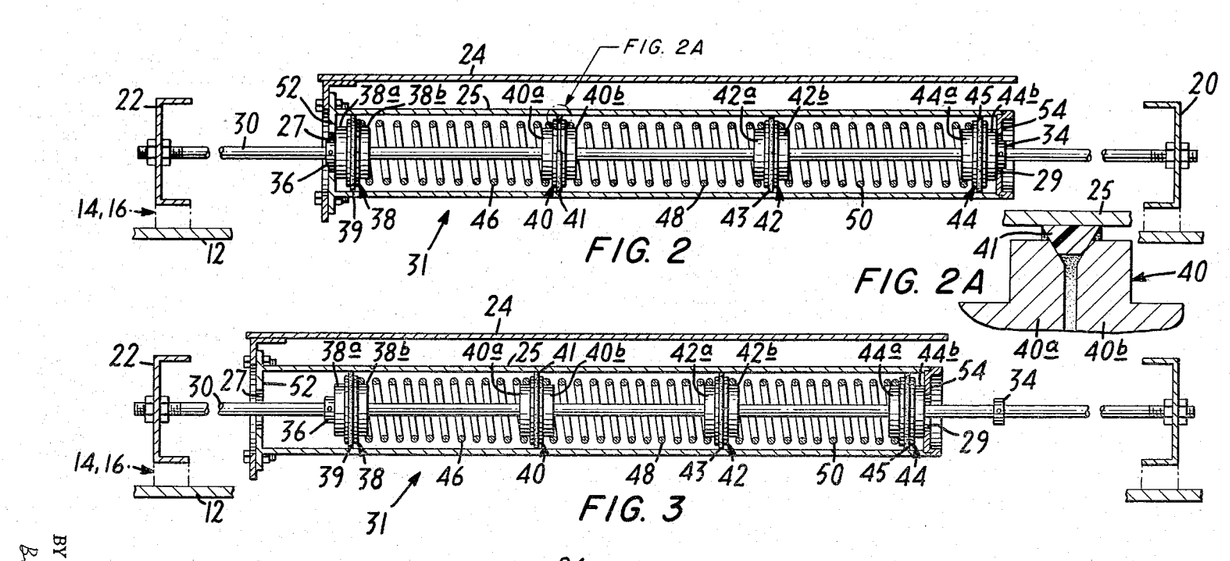
FIGURE 2 is a cross-sectional elevational view taken along lines 2—2 in the direction of the arrows as shown in FIG. 1 with the shock absorbing platform in an equilibrium position.
FIGURE 2A is an enlarged sectional view of a portion of the apparatus shown in FIG. 2.
FIGURE 3 is a cross-sectional, elevational view with the platform shown in FIG. 2 displaced leftwardly from the equilibrium position.

As best viewed in FIG 2A, the floating guides 38, 40, 42 and 44 each comprise a pair of guide elements 38a, 38b, 40a, 40b, 42a, 42b, 44a and 44b, respectively, and support a collar 39, 41, 43 and 45, respectively, between the corresponding guide elements thereof. These collars are of Teflon or a material having similar friction characteristics and make a sliding engagement with the interior surface of the sheath 25 so as to dampen relative axial movement between the collars and the sheath. The collars are generally wedge-shaped in cross section, so that the friction developed between the collars and the sheath 25 is proportional to the load on the springs 46, 48 and 50.

The four compression spring assemblies 31 of the primary braking system shown in the preferred embodiment in FIGS. 1–4, are substantially identical in construction and are positioned so that the braking load is distributed across the entire length of end wall 20 or end wall 22. Although the four compression assemblies 31 absorb the initial shock of a sudden change in horizontal velocity and permit the lateral displacement of the platform, a braking assembly 35 acts to ease the transition of the platform 24 back to the equilibrium position shown in FIG. 2.

Figure 5:
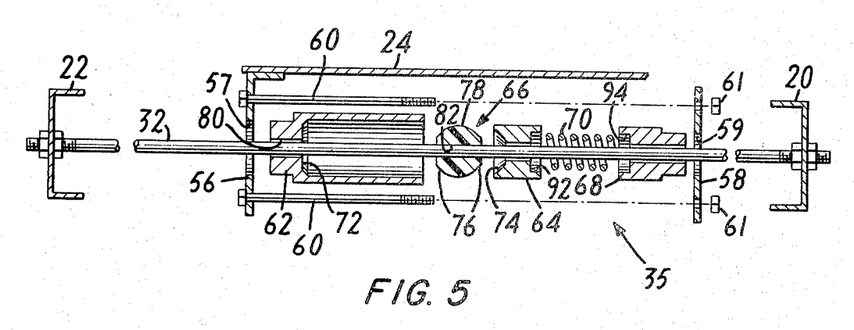
FIGURE 5 is a cross-sectional elevational view taken along the lines of 5–5 as shown in FIG. 1 with the parts shown therein separated for the purpose of clarity.
Figure 6:
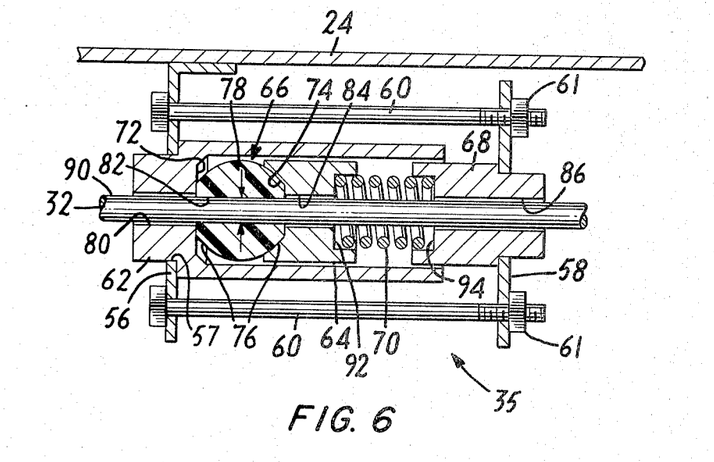
FIGURE 6 is a partial elevational view taken along the lines 5—5 as shown in FIG. 1.

Referring now to FIGS. 5 and 6, the braking assembly 35 is composed of the above-mentioned braking rod 32 which extends between the end walls 20 and 22 in the direction parallel to the longitudinal tracks 16 and 18. Attached to the movable platform 24 on its lower surface is a supporting wall 56 which has an aperture 57 through which the braking rod 32 extends. Attached to and spaced from supporting wall 56 is a plate 58 which is held in place by four horizontal rods 60 on which are threadedly mounted four nuts 61. The plate 58 has an aperture 59 which also is designed to receive braking rod 32 and to permit the movement of plate 58 in a direction parallel to the longitudinal axis of braking rod 32.

Between plate 58 and supporting wall 56 are a plurality of elements which form the braking assembly 35. These include a brake supporting bracket 62 which is attached to plate 58 and which has an aperture 80 passing through the center of its longitudinal axis for slidably surrounding rod 32. At the end of the brake supporting bracket 62 which is opposite plate 58 is a recess 72 in the form of a truncated cone. This recess 72 is designed to receive a braking element 66 which may be made of Teflon or a similar material having a low coefficient of static friction and a coefficient of sliding friction which increases with velocity. The braking element 66 has an aperture 82 which is designed to engage the outer surface 90 of rod 32 and has two generally truncated conical surfaces 76 adjacent the openings of aperture 82 on either side of the braking element 66. One of these conical surfaces 76 is designed to engage a truncated conical recess 74 in a brake supporting bracket 64 while the other conical surface 76 is designed to engage the conical recess 72 in the brake supporting bracket 62 as shown in the exploded view in FIG. 5. Brake supporting bracket 64 has a recess 92 on its reverse side for engaging a compression spring 70 which is held in place by a recess 94 of a blocking element 68 which, in turn, is firmly attached to the supporting wall 58. The brake supporting bracket 64 has an aperture 84 and the blocking element 68 has an aperture 86 designed to slidably surround brake control rod 32. The compression spring 70 forces both supporting brackets 62 and 64 together as shown in FIG. 6 and the conical surfaces 76 are pressed downwardly toward the outer surface 90 of rod 32 thereby causing it to be firmly engaged by the inner surface of braking element 66. The compression spring 70 may be preloaded to the desired extent by suitable adjustment of the nuts 61.

The brake in the preferred embodiment illustrated utilizes a Teflon sleeve having increasing friction with sliding velocity. As noted, the friction increases with velocity and decreases with increased pressure. The increase in friction with velocity is a characteristic which is opposite to that of other sliding materials. That is, the static or breakaway friction is greater than the sliding friction with most other materials. With Teflon this "stick-slip" phenomenon is eliminated. The static coefficient of friction will vary for unfilled Teflon from 0.02 to 0.14 depending primarily on the unit load. In addition to the preferred unfilled Teflon, certain Teflon yarns and fabrics also have coefficients of sliding friction which increase with the velocity at which they are moved over the braking surface.

Figure 7:
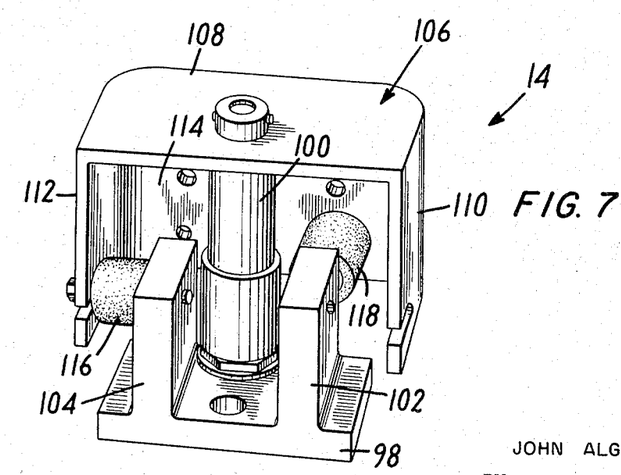
FIGURE 7 is a perspective view of a vertical shock absorbing apparatus disclosed in this invention.

The vertical dampening units 14 are shown in detail in FIG. 7 and each comprises a base element 98 which is designed to receive a preloaded unit such as the cylindrical column 100 and other supports 116 and 118, all of which contain yieldable cushioning materials for absorbing the low frequency vertical vibrations or shock loads experienced by the reference frame 12. The top of column 100 engages a floating bracket 106 which is designed to move primarily in a vertical direction.

Specifically, floating bracket 106 is composed of an upper plate 108, which is attached to the upper surface of column 100, and two side walls 110 and 112. A side plate 114 connects upper surface 108 and the side surfaces 110 and 112, and is designed to engage the longitudinal tracks 16 and 18. A pair of cushioning elements 116 and 118 are disposed between a pair of posts 104 and 102, respectively, on the base element 98 and the side wall 112 and side plate 114, respectively. The cushioning elements 116 and 118 support the vertical load transmitted through the dampening unit 14 from the platform 24 and help cushion the transmittal of low frequency vertical vibrations from the reference frame 12 to the supporting tracks 16 and 18.

The cushioning element 100 is preloaded and resists low frequency resonant vertical vibratory motion.

Figure 8:
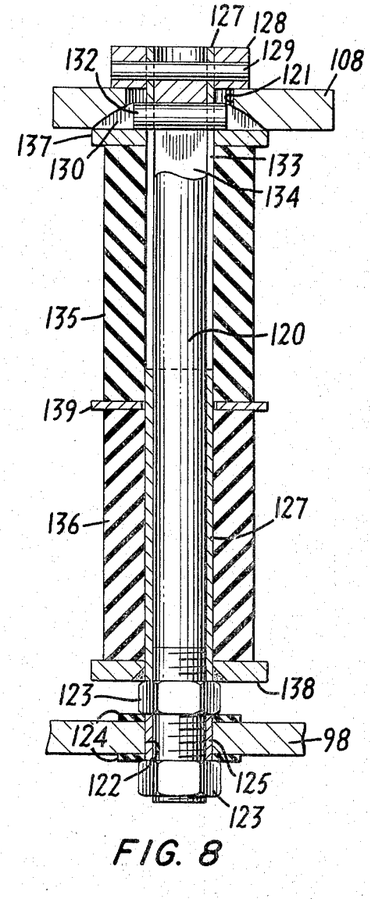
FIGURE 8 is an enlarged cross-sectional view of the vertical dampening structure of the vertical shock absorbing apparatus of FIG. 7.

FIG. 8 illustrates in cross section the internal components of the preloaded vertical dampening element of the unit 14 and, in particular, the internal components of column 100. A vertical rod 120 passes through an aperture 121 in the upper plate 108 and an aperture 122 in the base element 98. The rod 120 is mounted on the base element by a pair of nuts 123, a pair of rubber washers 124 between the nuts and the base element permitting the rod to tilt slightly with respect to the base element if the reference frame 12 experiences an excessive horizontal shock load, thus preventing damage to the rod from bending. A spacer 125 insures that the nuts 123 are not tightened to an extent that would damage the washers 124.

The rod 120 is received in a sleeve 127. To the upper end of the sleeve is mounted a cap 128 by means of a pin 129, the cap 128 overlapping and bearing against the upper surface of the upper plate 108 adjacent the edges of the aperture 121. The lower surface of the upper plate 108 is countersunk to receive a spherical self-aligning washer 130 which mounts a transverse pin 132. The pin 132 is slidably received in a pair of longitudinal slots 133 and 134 in the sleeve 127 and the rod 120, respectively.

The vertical dampening structure is designed so that forces which drive the upper plate 108 and the base element 98 toward each other compress a pair of rubber supporting mounts 135 and 136 between a pair of disc washers 137 and 138. In this case the upper plate 108 and the cap 128 are separated. The washer 137 is slidably mounted on the sleeve 127, but the washer 138 is rigidly secured to this sleeve. In the embodiment shown in FIG. 8, the mounts 135 and 136 are separated by a washer 139 and thus act as two springs in series. Forces which separate the upper plate 108 and the base element 98 also compress the rubber supporting mounts between the washers 137 and 138, inasmuch as upward movement of the washer 130 is prevented by the engagement of the pin 132 with the top of the slot 134 in the rod 120. In this case the upper plate 108 and the washer 130 are separated.

Figure 9:
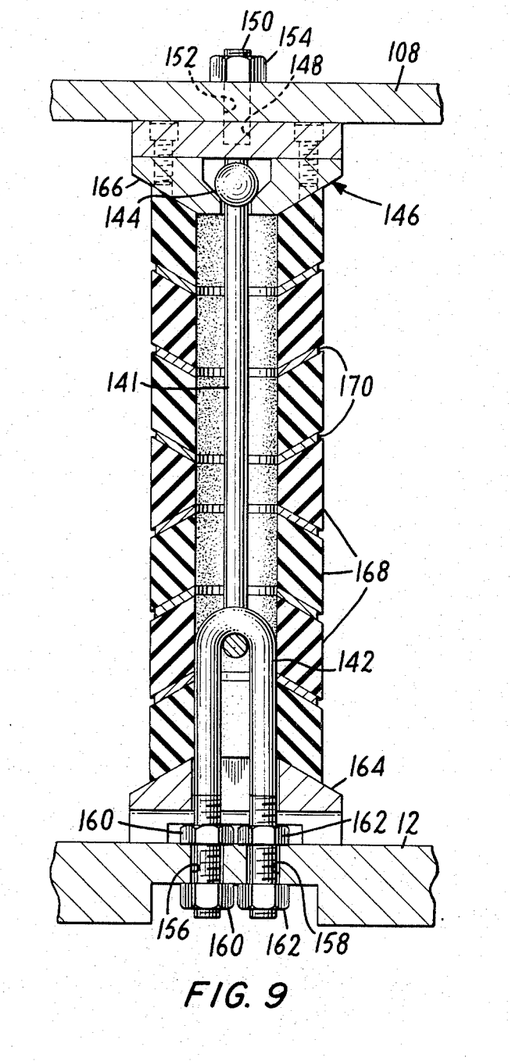
FIGURE 9 is a cross-sectional view of an alternate embodiment of the vertical dampening structure of FIG. 8.

In FIG. 9, a cross-sectional view of an alternate embodiment of the vertical dampening structure within the column 100 is shown. In this embodiment, an upper rod 141 passes through a loop in a lower rod 142 and terminates in a pair of ball elements 144 which are held in place by a socket 146. The socket 146 is, in turn, positioned below the upper plate 108 and has a threaded recess 148 in its upper surface for receiving a locking bolt 150. The locking bolt 150 passes through an aperture 152 in the upper plate 108, and fastening means 154 secures the entire unit including the socket 146 in place.

The lower rod 142 is also looped and passes through two apertures 156 and 158 in the reference platform 12. By suitably adjusting fastening means 160 and 162, it is possible to drive a pair of wedging surfaces 164 and 166 together, thereby compressing a plurality of tubular rubber elements 168 arranged in series between these two surfaces 164 and 166. Suitable washers 170 separate adjacent rubber elements 168.

In the embodiments shown in FIGS. 8 and 9, it is possible to pre-stress the vertical dampening unit 14 and thereby adjust the response of the platform 24 to vertical vibrations. The amount by which the vertical dampening unit of FIG. 8 can be pre-stressed is fixed and is dependent upon the dimensions of the components thereof. The vertical dampening unit of FIG. 9, however, may be pre-stressed as desired, the amount of pre-stressing being determined by the adjustment of the fastening means 160 and 162.

Figure 1:
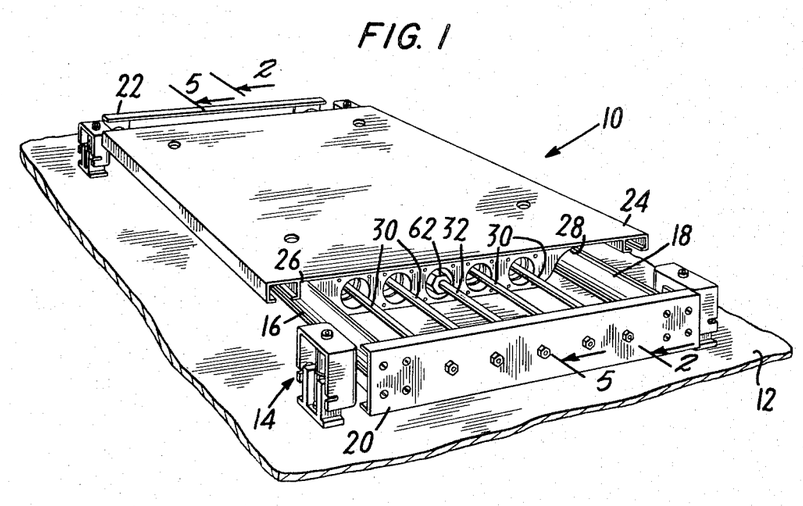
FIGURE 1 shows a perspective view of a shock absorbing platform in which this invention has been incorporated.
Figure 10:
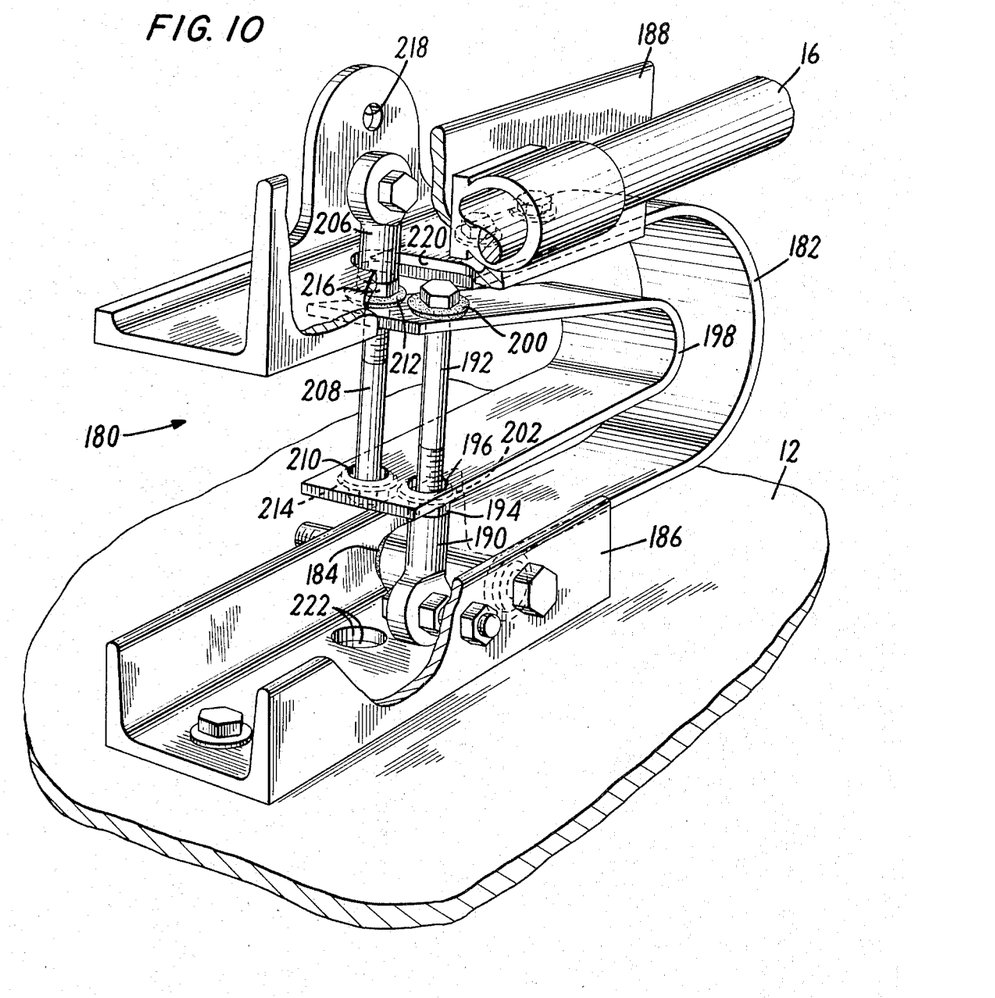
FIGURE 10 is a perspective view of an alternate embodiment of the vertical shock absorbing apparatus of FIG. 7.

FIG. 10 illustrates in prespective an alternate embodiment of vertical shock absorbing apparatus for the shock absorbing platform of FIG. 1. The vertical shock absorber 180 includes a generally U-shaped flat spring 182 which is pivotally mounted at one end through rubber bushing 184 to a lower bracket 186 which is suitably secured to the reference platform 12. The other end of the spring is secured to an upper bracket 188, which, in turn, is fastened to the supporting track 16, for example. Pivotally mounted on the lower bracket is a socket 190 which threadedly receives a bolt 192, a lock nut 194 securing the bolt 192 in any position to which it may be adjusted in the socket 190.

A pair of apertures 196 through the ends of a generally U-shaped flat spring 198 slidably receives the bolt 192, the ends of this spring being disposed between the lock nut 194 and the head of the bolt 192. A pair of wedging and self-aligning washers 200 and 202, which may be of Teflon for example, are carried by the bolt 192 between the bolt head and the upper end of the spring 198, and between the lock nut and the lower end of the spring, respectively. The outside surfaces of the spring 198 around the apertures 196 are suitably countersunk to receive the washers 200 and 202.

Similarly, a socket 206 pivotally mounted on the upper bracket threadedly receives a bolt 208 which extends through a pair of apertures 210 in the ends of the spring 198, a pair of Teflon wedging and self-aligning washers 212 and 214 on the bolt 208 being disposed between a lock nut 216 and the upper end of the spring 198, and between the bolt head and the lower end of the spring 198, respectively.

The spring 198 may be pre-stressed as necessary to adjust the response of the platform 24 to vertical vibrations, the desired amount of pre-stressing being attained by appropriate adjustment of the bolts 192 and 208. Also, the pre-stressed spring 198 resists low frequency resonant vertical vibratory motion. Inasmuch as substantial adjustment of these bolts may stress the spring 182 to an appreciable extent, the socket 206 may be remounted on the upper bracket 188 at an aperture 218 therein in order to reduce such stress in the spring 182. It is to be understood that additional apertures 218 may be provided as necessary. The spring 182 supports the vertical load transmitted through the shock absorber 180 from the platform 24 and helps cushion the transmittal of low frequency vertical vibrations from the reference frame 12 to the supporting tracks 16 and 18. The springs 182 and 198 are preferably made of spring steel.

The extent to which the brackets 186 and 188 may be displaced toward or away from each other is determined by the spacing between the ends of the spring 198, the bolts 192 and 208 passing through apertures 220 and 222 in the upper bracket 188, and the lower bracket 186 and the reference platform 12, respectively, when the brackets are displaced toward each other.

Thus in all of the embodiments of the vertical shock absorbing apparatus according to the invention, first cushioning elements or a first spring support the platform 24 and the lading thereon, while a second preloaded cushioning element or spring with its associated linkage resists relative movement between the platform 24 and the reference frame 12 with an initial force caused by the pre-stressed condition of the second cushioning element or spring. If the preloaded cushioning element or spring were not included, the platform would resonate because of low frequency input vibratory forces which may be encountered.

In operation, the slidable platform incorporating this invention is designed generally to decelerate or accelerate at a more gradual rate than the deceleration or acceleration of the reference frame 12. In addition, the further employment of a secondary braking element which increases its resistance to movement with an increase in velocity, provides for the rapid stabilization of the entire shock absorbing system.

The shock absorbing platform 24 may be mounted in a railroad car so as to prevent the transmission of low frequency vibrations to highly sensitive apparatus being transported therein. These low frequency vibrations occur commonly during the coupling operations when, for example, the reference frame 12 of a railroad car couples suddenly with a non-moving railroad car. When this occurs the longitudinal tracks 16 and 18 will also decelerate rapidly since the vertical shock absorbers 14 and 180 do not filter horizontal vibrations. The end walls 20 and 22, together with the guide rods 30, braking rod 32, and stops 34 and 36 will also experience this same deceleration rate.

If one were to assume that the reference frame 12, as shown in FIG. 2, was traveling in a leftwardly direction and one were to assume further that reference frame 12 experienced a sudden deceleration, the movable platform 24, on which is fastened the sensitive equipment being transported, would continue to move in a leftwardly direction to the position shown in FIG. 3. In this case the springs 46, 48 and 50 would collapse under the force exerted on float 44 by the platform impeller 54. The stop 36, however, at the other end would continue to engage the outer surface of floating guide 38 thereby preventing its leftward movement although the aperture 27 of impeller 52 permits it to pass over and beyond stop 36 toward the end wall 22. The springs 46, 48 and 50, of course, resist the movement of platform 24 and its load with a gradually increasing force with the final result that the platform 24 will, after a short delay, attain the same velocity as the reference frame 12 although it will be displaced slightly in the direction of deceleration.

Figure 4:
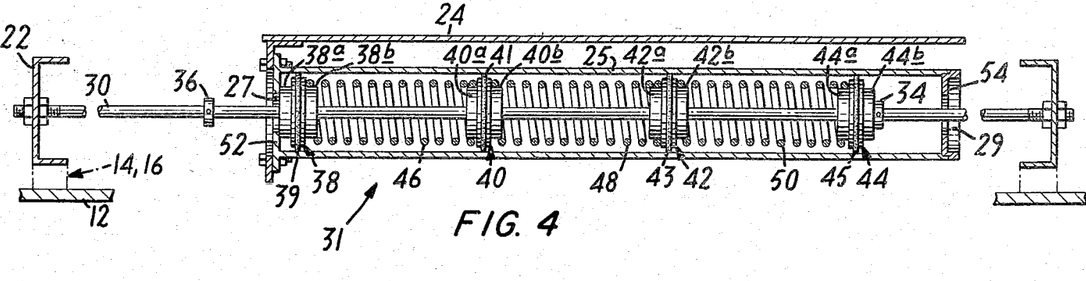
FIGURE 4 is a cross-sectional elevational view with the platform shown in FIG. 2 displaced rightwardly from the equilibrium position.

As can be observed in FIG. 4 a sudden acceleration of the platform 12 in the leftwardly direction, or a deceleration of platform 12 in a rightwardly direction, will cause a similar collapse of the springs 46, 48 and 50. However, in this case stop 34 will continue to engage floating guide 44 as impellers 52 move floating guides 38 in a rightward direction until the movable platform attains the same velocity as the reference frame 12. In this case the aperture 29 of impellers 54 pass over stop 34 and move toward end wall 20.

In the preferred embodiment, when the springs 46, 48 and 50 of each compression cylinder 31 reach a position of maximum compression as shown in either FIGS. 3 or 4 and when the force exerted by these springs against either the floating member 38 or 44 gradually increases to overcome the movement of the platform 24 there will be a tendency for the springs to drive the platform 24 and its load at an ever increasing velocity towards the equilibrium position shown in FIG. 2. However, since the force exerted by the springs 46, 48 and 50 will continue until the platform 24 reaches the equilibrium position, the platform 24 and its load will have a specific velocity at the equilibrium point which will carry them beyond that position in the opposite direction. Thus, there would be a tendency for the movable platform 24 to oscillate from one end of the track to the other with gradually decreasing displacement until the final equilibrium position is reached.

To overcome this undesirable condition, a braking assembly 35 is provided which has a braking element 66 composed of a substance such as Teflon which has a low static coefficient of friction and a sliding coefficient of friction that increases with velocity. The low coefficient of static friction permits the load of the platform 24 to move freely along rod 32 when reference frame 12 suddenly experiences an acceleration or a deceleration. Thus, there is no initial jarring movement transmitted to the platform 24 when the static coefficient is suddenly overcome. When, for example, the reference frame, moving in a leftward direction suddenly decelerates, the inner aperture 82 of braking element 66 bears against outer surface 90 of rod 32 and tends to resist the movement of the platform 24 with respect to the reference frame 12. Thus the braking surface in addition to the compression springs 46, 48 and 50 transmits a dampening force on the moving platform 24, a combined force, however, which is, nevertheless, less than the force which alters the acceleration or deceleration of reference frame 12. The braking element 66 which is pressed firmly against rod 32 by the brake supporting elements 62 and 64 also exerts a braking force on the return movement of platform 24 toward the equilibrium position in response to the force exerted by the compression springs 46, 48 and 50. Thus the recoiling movement of the platform 24 in the reverse direction by the springs 46, 48 and 50 causes a condition where the movement of braking element 66 over rod 32 constantly increases with velocity thereby causing a constant increase in the coefficient of friction of the Teflon braking surface which, in turn, dampens and greatly reduces the recoil displacement. In this manner the movable platform returns to the equilibrium position without a series of undesirable oscillations.

It is to be noted that the spring constants, the degree of compression of the springs, and the coefficient of friction of the sliding member can be adjusted to the setting required by the acceleration and deceleration loads expected in a specific operational environment. For example, when using the shock absorber disclosed herein in combination with railroad equipment, a force limit of approximately two times the force of gravity could be expected. By choosing the proper spring constants and displacement limits, this device can reduce the force experienced by the load by over ninety percent.

Although this invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

I claim:
1. A shock absorbing apparatus comprising
supporting means,
movable means slidable on said supporting means in directions of primary movement, and biased toward an equilibrium position,
resilient means for accelerating and decelerating the movement of said movable means more gradually than the acceleration and deceleration of said supporting means,
a braking element on one of said supporting means and said movable means for braking the return of said movable means to said equilibrium position, said braking element having a low static coefficient of friction and a sliding coefficient of friction which increases with an increase in velocity, a brake surface on the other of said supporting means and said movable means in sliding engagement with said braking element and resilient means biasing said braking element against said braking surface.

2. A shock absorbing apparatus comprising supporting means, movable means slidable on said supporting means in directions of primary movement, and biased toward an equilibrium position, resilient means for accelerating and decelerating the movement of said movable means more gradually than the acceleration and deceleration of said supporting means, and a braking surface element engageable with said supporting means for braking the return of said movable means to said equilibrium position, said braking surface element having a low static coefficient of friction and a sliding coefficient of friction which increases with velocity,
said supporting means having a rod extending in the directions of primary movement which is engageable with said braking surface,
said braking surface element having an aperture passing through its center suitable for surrounding and sliding on the rod of said supporting means, said braking surface element having two conically shaped ends proceeding away from said center aperture and,
said movable means having two brake supporting portions, each with a conically shaped recess which is engageable with one of said conical surfaces of said braking surface element whereby said braking surface element is continually pressed against said rod of said supporting means.

3. A shock absorbing apparatus as defined in claim 2 wherein said movable means has resilient means for forcing said two conical recesses against the two opposite conical ends of said braking surface element whereby the frictional engagement of said braking surface element and the rod of said supporting means is continually maintained.

4. A shock absorbing apparatus as defined in claim 3 wherein said braking surface element is composed of Teflon.

5. A shock absorbing apparatus as defined in claim 3 wherein said supporting means includes two fixed, parallel, longitudinal tracks, one on each side of and parallel to said rod,
wherein said movable means includes a platform having protruding portions slidably supported on said longitudinal tracks, and
wherein said two aperture portions with conically shaped recesses and said braking surface element located therebetween are all positioned below said platform and surrounding said centrally located braking rod.

6. A shock absorbing apparatus as defined in claim 1 wherein said resilient means for accelerating and decelerating the movement of said movable means comprises
at least one guide rod attached to said supporting means and passing through said movable means, said guide rod having two spaced protruding stops fastened to it,
spaced impeller means attached to said movable means, each of which impeller means can move to either side of a different one of said protruding stops in a direction parallel to said guide rod,
spaced floating means freely slidable on said guide rod between said stops, each of said floating means being engageable with said stops and with said impeller means, and
a resilient unit positioned adjacent said guide rod between said spaced floating means, said resilient means being compressible between said spaced floating means when one portion is engaged by one of said fixed protruding stops and the other spaced portion is engaged by one of said impeller means thereby resisting the movement of said movable means as it slides along said supporting means.

7. A shock absorbing device suitable for altering the sudden movements of a reference frame comprising
supporting means,
movable means freely slidable on said supporting means,
at least one guide rod attached to said supporting means and passing through said movable means, said guide rod having two spaced protruding stops fastened to it,
spaced impeller means attached to said movable means, each of which can move to either side of a different one of said protruding stops in a direction parallel to said guide rods,
spaced floating means freely slidable on said guide rods between said steps, each of said floating means being engageable with said stops and with said impeller means,
resilient means positioned adjacent said guide rods between said spaced floating means, said resilient means being compressible between said floating means when one of said floating means is engaged by one of said fixed protruding stops and another of said floating means is engaged by one of said impeller means thereby resisting the movement of said movable means as it slides along said supporting means, and
means for braking the return of said movable means to an equilibrium position in which said floating means each engages said protruding stops.

8. A shock absorbing apparatus comprising
supporting means,
means defining a track including two longitudinal supporting elements extending in the directions of prime movement of said supporting means and including two spaced end portions bridging said two longitudinal supporting elements,
movable means freely slidable on said two longitudinal supporting elements between said spaced end portions,
at least one guide rod attached to each of said spaced end portions and passing through said movable means, said guide rod having two spaced protruding stops fastened to it,
spaced impeller means attached to said movable means each of which impeller means can move to either side of one of said protruding stops in a direction parallel to said guide rod,
spaced floating means freely slidable on said guide rod between said stops, each of said floating means being engageable with said stops and said impeller means,
resilient means positioned adjacent said guide rods between said spaced floating means, said resilient means being compressible between said floating means when one is engaged by one of said fixed protruding stops and the other is engaged by one of said impeller means thereby resisting the movement of said movable means as it slides along said two longitudinal supporting elements, and
means for braking the return of said movable means to an equilibrium position in which said floating means each engages said protruding stops.

9. A shock absorbing apparatus for resisting the transmission of shocks from a reference frame to a load on a platform comprising
first U-shaped spring means mounted between the reference frame and the platform for supporting the platform and the load,
second pre-stressed U-shaped spring means mounted between the reference frame and the platform, and
linkage means connecting one end of said second spring means to said platform and the other end of said second spring means to said reference frame for causing said second spring means to resist relative movement between the platform and the reference frame with an initial force caused by the pre-stressed condition of said second spring means.

10. A shock absorbing apparatus for resisting the transmission of shocks from a reference frame to a load on a platform comprising first spring means mounted between the reference spring and the platform and the load, second pre-stressed means mounted between the reference spring and the platform, and linkage means for causing said second spring means to resist relative movement between the platform and the reference frame with an initial force caused by the pre-stressed condition of said second spring means,
said first spring means including a generally U-shaped flat spring pivotally mounted at one end to one of the reference frame and the platform, said second spring means including a generally U-shaped flat spring having two pairs or aligned apertures at the ends thereof, and said linkage means including
first socket means pivotally mounted to the reference frame,
first bolt means threadedly received in said first socket means and extending through one of the two pairs of aligned apertures, the ends of said second spring means being disposed between the head of said first bolt means and said first socket means,
second socket means pivotally mounted to the platform,
second bolt means threadedly received in said second socket means and extending through the other of the two pairs of aligned apertures, the ends of said second spring means being disposed between the head of said second bolt means and said second socket means.

References Cited

UNITED STATES PATENTS

| | | | |
|---|---|---|---|
| 2,092,919 | 9/1937 | Johnson | 248—22 |
| 2,717,747 | 9/1955 | Rosenzweig | 248—24 |
| 2,762,600 | 9/1956 | Mordarski et al. | 248—358 |
| 2,841,354 | 7/1958 | Humble | 248—358 |
| 2,900,157 | 8/1959 | Anke | 248—119 |
| 3,116,056 | 12/1963 | Maier. | |
| 3,134,462 | 5/1964 | Messinger. | |
| 3,144,838 | 8/1964 | Shaver et al. | 105—392.5 X |

ROY D. FRAZIER, *Primary Examiner.*

CHANCELLOR E. HARRIS, *Examiner.*

R. P. SEITTER, *Assistant Examiner.*